April 19, 1949.  B. E. BALDUF  2,467,651
ROLLER SLOT SIZING MACHINE
Filed Dec. 21, 1945  6 Sheets-Sheet 1

INVENTOR:
BRUNO E. BALDUF
BY
ATTORNEY

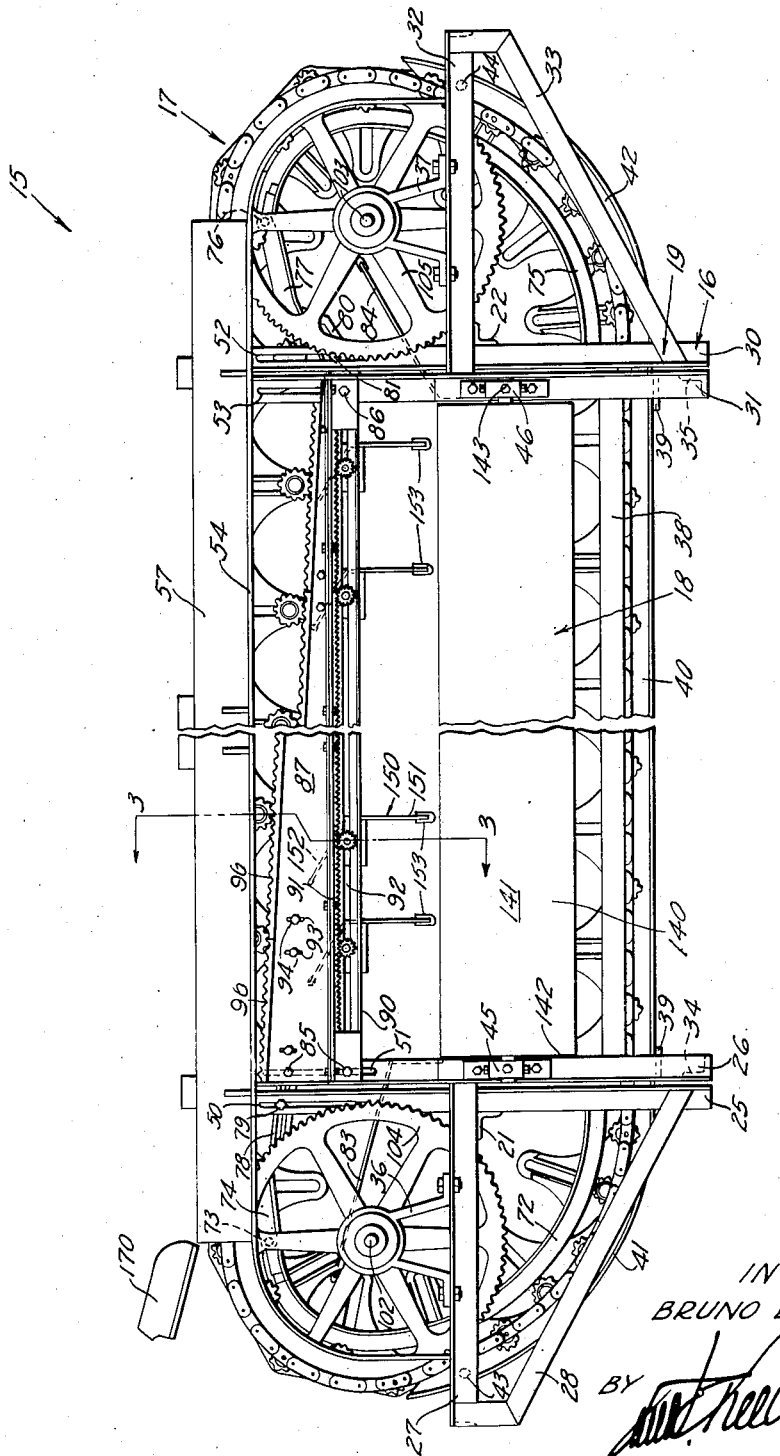

April 19, 1949.                  B. E. BALDUF                    2,467,651
                           ROLLER SLOT SIZING MACHINE
Filed Dec. 21, 1945                                          6 Sheets-Sheet 3
INVENTOR:
BRUNO E. BALDUF
BY
ATTORNEY

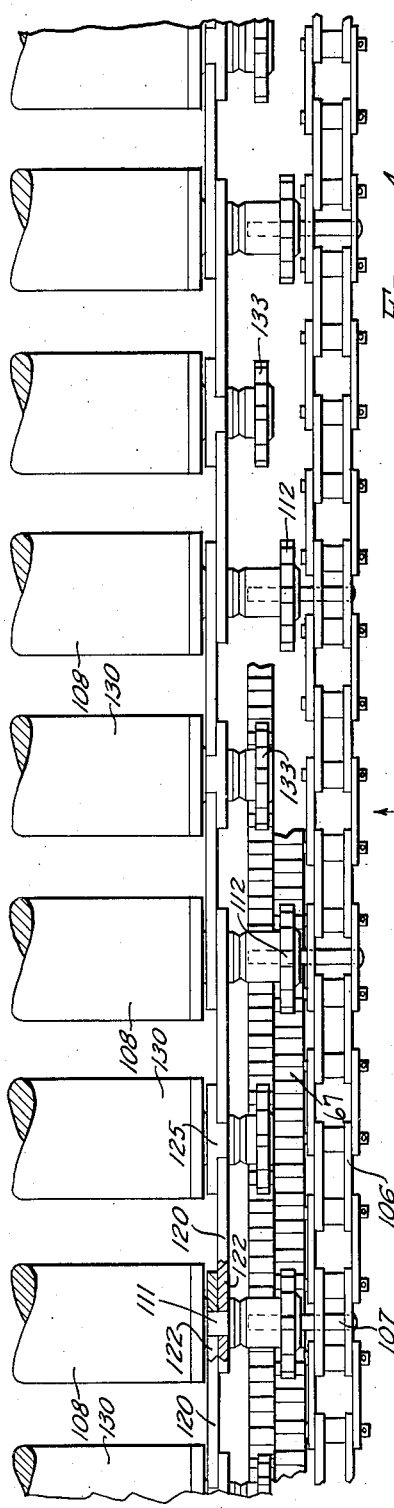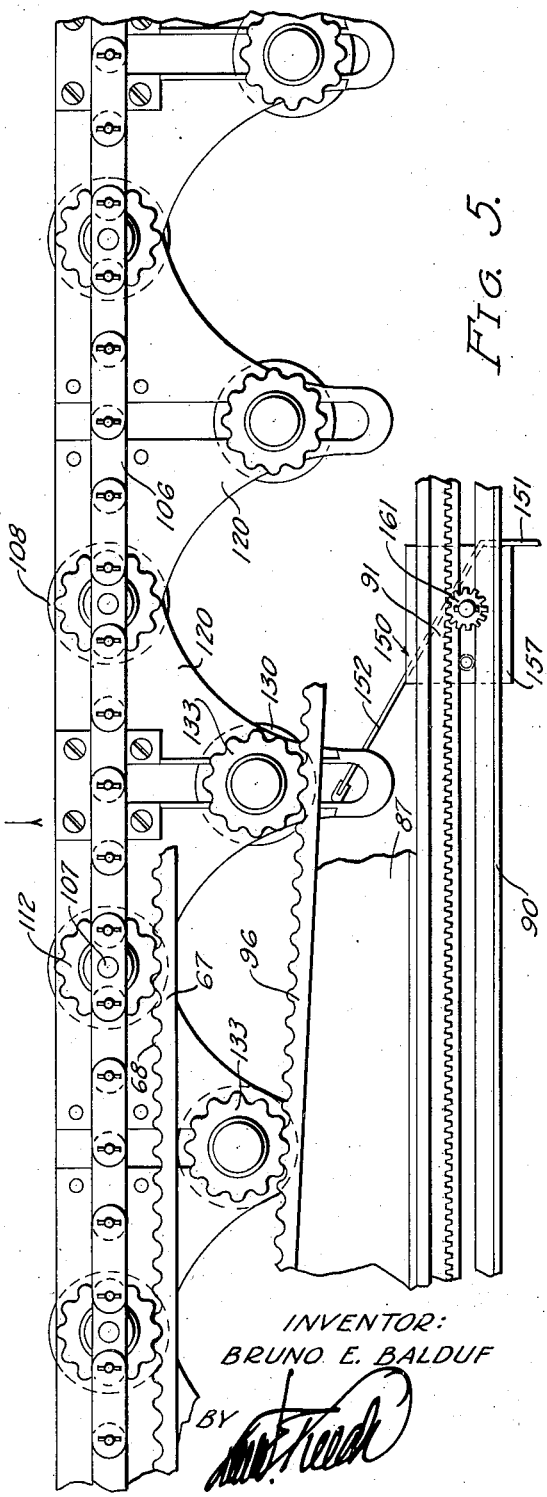

April 19, 1949. B. E. BALDUF 2,467,651
ROLLER SLOT SIZING MACHINE
Filed Dec. 21, 1945 6 Sheets-Sheet 5
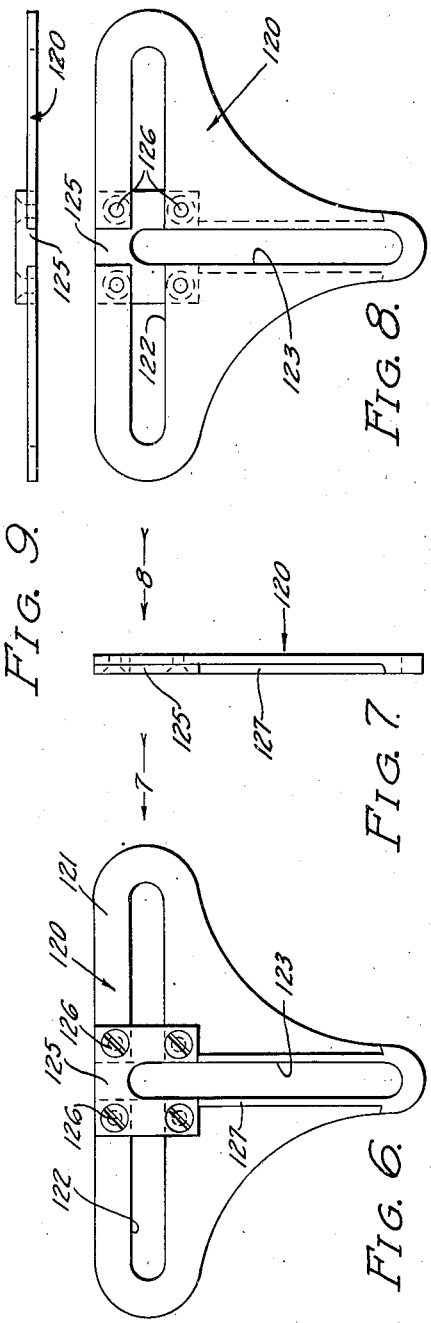
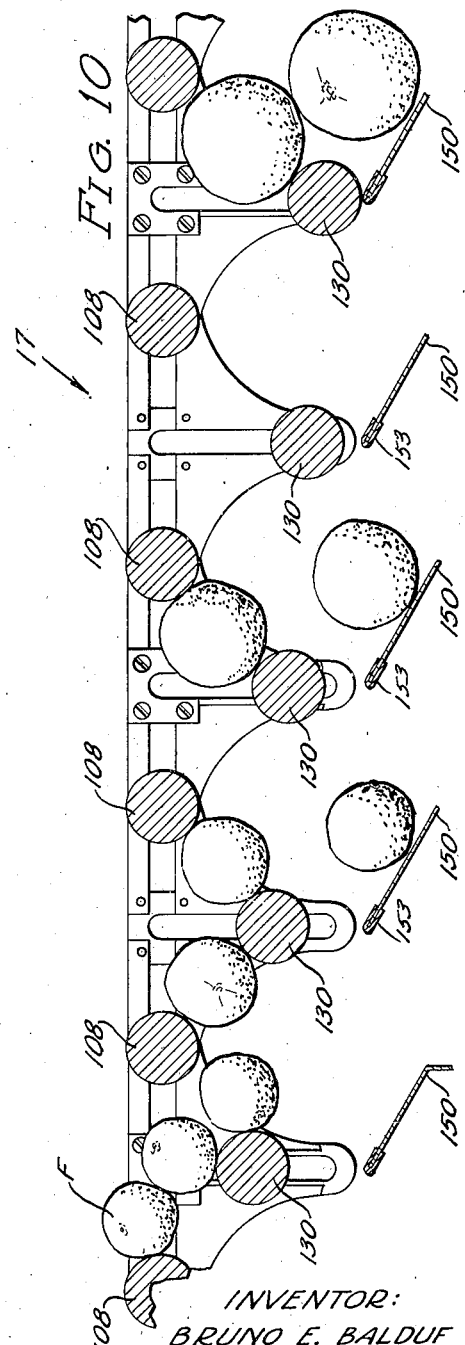
INVENTOR:
BRUNO E. BALDUF
BY
ATTORNEY April 19, 1949.    B. E. BALDUF    2,467,651
ROLLER SLOT SIZING MACHINE
Filed Dec. 21, 1945    6 Sheets-Sheet 6
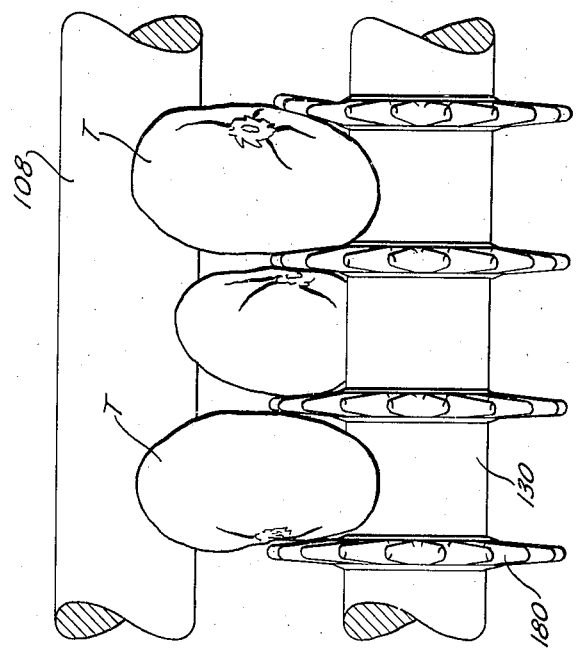
FIG. 12.
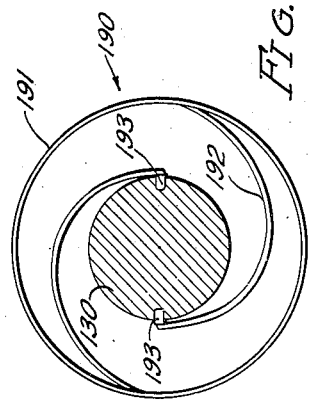
FIG. 13.
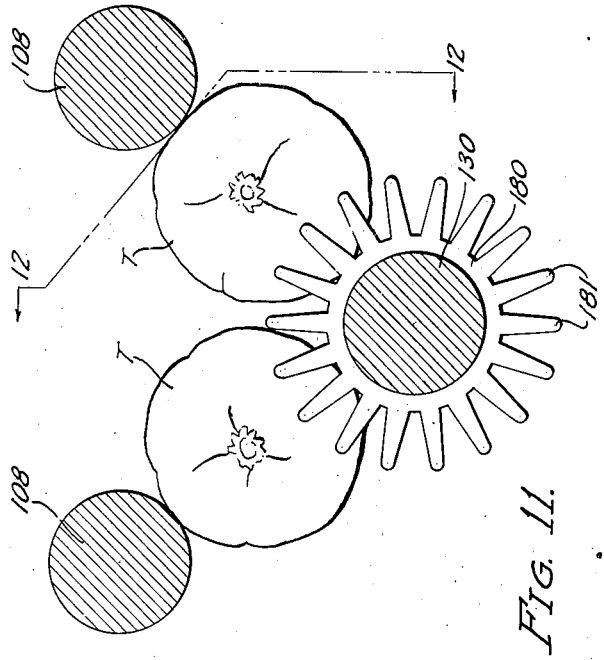
FIG. 11.
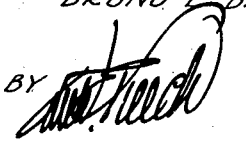
INVENTOR:
BRUNO E. BALDUF
BY
ATTORNEY Patented Apr. 19, 1949

2,467,651

UNITED STATES PATENT OFFICE 2,467,651

ROLLER SLOT SIZING MACHINE

Bruno E. Balduf, Rockford, Ill., assignor to Food Machinery and Chemical Corporation, a corporation of Delaware Application December 21, 1945, Serial No. 636,533

8 Claims. (Cl. 209—106)

This invention has to do with the art of separating rollable articles in accordance with their sizes and has particular utility in the sizing of fresh fruit such as oranges, grapefruit, lemons, apples, cantaloupes and the like.

The invention aims at satisfying the following commercial needs: (1) need for a sizer having a relatively large capacity, (2) the need for a sizer which accomplishes the segregation of the fruit handled thereby with a relatively high degree of precision, (3) the need for a sizer which will handle fruit differing in diameter over a relatively large range and (4) the need for a sizer which may be readily adjusted to vary the character of the groups into which the fruit is separated.

The manner of accomplishing the foregoing objects, as well as further objects and advantages, will be made manifest in the following description taken in connection with the accompanying drawings in which:

Fig. 2 is a side elevational view of Fig. 1.

Fig. 3 is an enlarged diagrammatic cross sectional view taken on the line 3—3 of Fig. 2.

Fig. 4 is a diagrammatic horizontal sectional view taken on the line 4—4 of Fig. 3.

Fig. 5 is an enlarged diagrammatic side elevational view taken in the direction of the arrow 5 in Fig. 4.

Fig. 6 is an inside elevational view of one of the drop roll guides of the invention.

Fig. 7 is an end elevational view of said drop roll guide taken in the direction of the arrow 7 in Fig. 6.

Fig. 8 is an outside elevational view of said drop roll guide taken in the direction of the arrow 8 in Fig. 7.

Fig. 9 is a plan view of the drop roll guide as shown in Fig. 8.

Fig. 10 is a diagrammatic enlarged cross sectional view taken substantially on the line 10—10 of Fig. 1 and illustrating the operation of the invention.

Fig. 11 is an enlarged cross sectional view of a modified form of the invention in which the drop roller thereof is supplied with a series of rings for handling fruit with the axis thereof parallel with the rollers when the length of the axis of the fruit is substantially less than the diameter thereof.

Fig. 12 is a transverse sectional view taken on the line 12—12 of Fig. 11.

Fig. 13 is a transverse sectional view of a drop roll of the invention equipped with a second modified form of fruit positioning ring formed preferably of spring wire.

Figure 1:
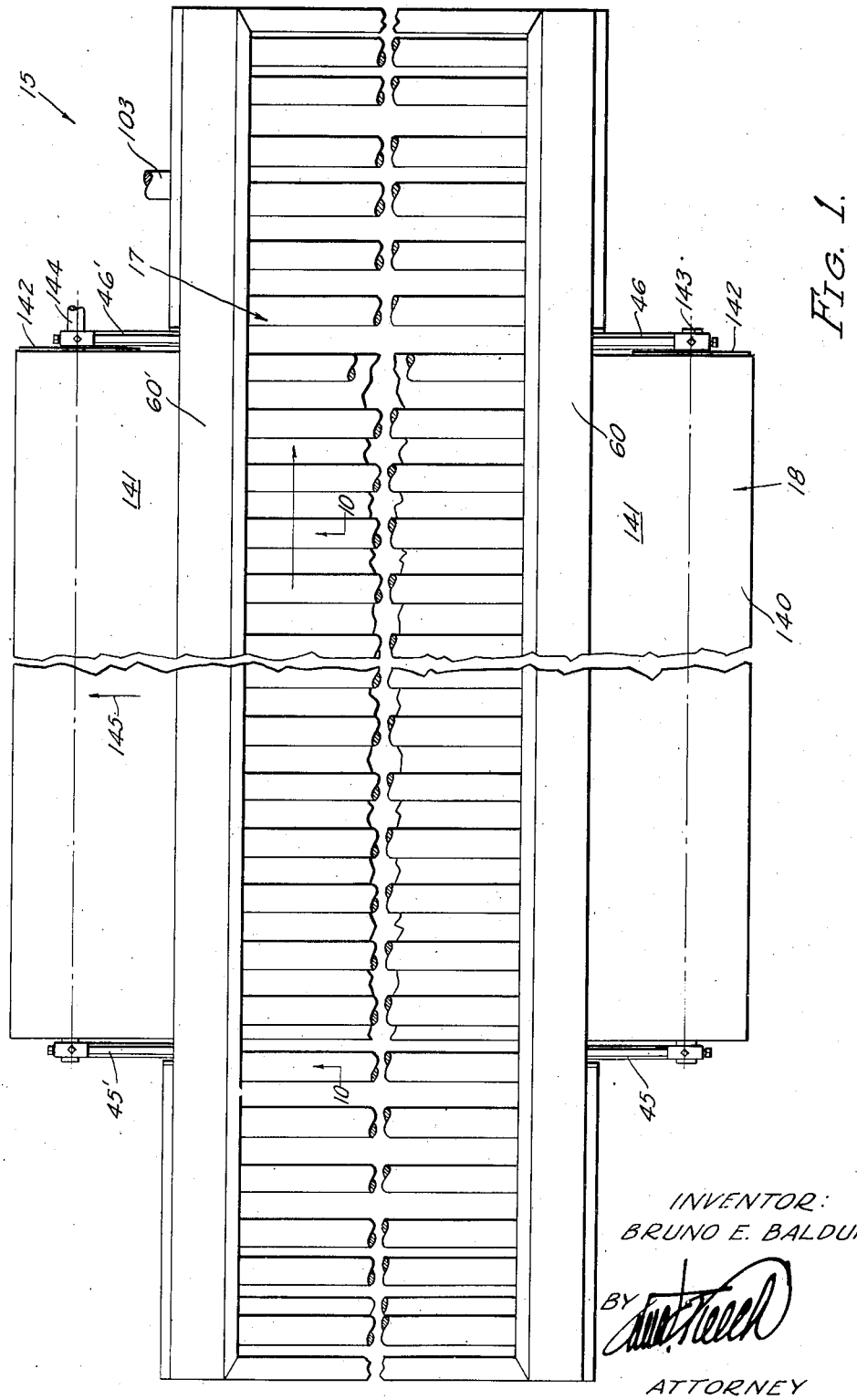
Fig. 1 is a diagrammatic plan view of a preferred embodiment of the invention.

Referring specifically to the drawings, the sizer shown therein may be designated generally by the numeral 15 and includes a frame 16, a sizing conveyor 17, and a fruit segregating and discharge mechanism 18.

The frame 16

The frame 16 includes two side assemblies 19 and 20 which are reverse duplicates of each other and which are rigidly joined in spaced relation as by transverse angle iron members 21 and 22 (Fig. 2). Reference numbers used in the detailed description of assembly 19 will be employed in the drawings with prime attached to designate corresponding parts of the assembly 20.

The side assembly 19

The assembly 19 has a pair of angle iron legs 25 and 26 which are disposed in close parallel relation, the leg 25 being off-set inwardly from the leg 26 and joined thereto by both of these legs being welded to a horizontal angle bearing support 27 having a brace 28 extending from its outer end to the lower end of the leg 25. At the opposite end of the machine, the assembly 19 has a pair of similar angle iron legs 30 and 31 which are similarly related to each other and are connected together by being welded to a horizontal bearing support 32, the outer end of which is connected by a brace 33 extending to the lower end of the leg 30. The adjacent end of the transverse angle member 21 is welded to leg 25 and horizontal bearing support 27. The adjacent end of the transverse angle member 22 is welded to the leg 30 and horizontal bearing support 32. The assemblies 19 and 20 are also rigidly connected by transverse angle members 34 and 35 which are welded to the lower ends of the legs 26 and 31.

Provided on the bearing supports 27 and 32 are bearings 36 and 37 respectively.

The legs 26 and 31 are connected by a horizontal member 38 as by welding. Supported in parallel relation with the member 38 and spaced below and inwardly therefrom on the inner ends of lugs 39 provided on the legs 26 and 31 is a rail 40, opposite ends 41 and 42 of which curve upwardly and are supported by suitable spacers 43 and 44 on the bearing supports 27 and 32. Fixed upon and extending outwardly from legs 26 and 31 are bearings 45 and 46. The upper ends of the legs 25 and 26 are provided respectively with vertical slots 50 and 51. The upper ends of legs 31 and 30 are provided with corresponding vertical slots 52 and 53.

Welded onto the upper ends of the legs 25, 26, 30 and 31 is a horizontal plate 54, opposite end portions of which curve downwardly and are connected to the bearing support members 27 and 32. Welded onto the plate 54 is a vertical plate 57. Welded to the inner upper edge of the plate 57 is an angle member 58 on which housing brackets 59 are provided for supporting a housing 60 which encloses the plate 57 and adjacent mechanism. The housing 60 extends inwardly to provide a fruit guard wall 61 at that side of the sizing conveyor 17.

Carried by the plate 54 and the angle members 58 are upper and lower chain rails 65 and 66. Provided on the inner edge of the plate 54 is a primary roller wheel track 67, the upper surface of which is preferably provided with rack teeth 68. In the assembly 20, the corresponding track 67' has a smooth upper surface, the reason for which will be made clear hereinafter.

Secured at its lower end to the leg 25 and disposed inwardly from the left-hand curved rail-end 41 is an inner curved rail 72, the upper end of which is connected by a pivot 73 to a terminal rail 74.

Fixed at its lower end on the leg 30 and disposed inwardly from the curved rail end 42 is an inner curved rail 75, the upper end of which is connected by a pivot 76 to a terminal rail 77.

The rail 74 has a slotted member 78 which lies against the inner face of the leg 25 and is adjustably secured thereto by a bolt 79 which extends through this member and through the slot 50 in the leg 25.

The rail 77 has a similar slotted member 80 which lies against the inner face of the leg 30 and is adjustably secured to the latter by a bolt 81 which extends through the slot 52 in the leg 30 and through slotted member 80.

Fixed on the frame 16 at opposite edges of the segregating and discharge mechanism 18 are fruit ramps 83 and 84.

Secured to upper ends of the legs 26 and 31 by bolts 85 and 86 which pass respectively through the slots 51 and 53 is a sizer control and baffle support plate 87. This plate has a lower flange 88 which is united as by bolts 89 to a channel member 90 having a rack 91 and a slot 92 extending practically the entire length of the channel 90. Passing through slots 93 in the plate 87 are bolts 94 which adjustably secure angle sections 95 to said plate, each of these sections having a rail section 96 provided thereon. The upper surface of each of these sections is preferably provided with rack teeth 97 and the sections 95 are capable of being secured on the plate 87 so as to cause all of the rail sections 96 to be assembled in a straight but downwardly sloping line as shown in Figs. 2 and 3. Corresponding rail sections 96' in the frame side assembly 20 have smooth upper surfaces for a reason which will be made clear hereinafter.

Sizing conveyor 17

This conveyor includes shafts 102 and 103 which are journaled respectively in bearings 36—36' and 37—37' and carry spaced sprockets 104 and 105 respectively. Suitable means (not shown) is provided for applying power to rotate the shaft 103 to drive the conveyor 17.

Trained about the sprockets 104 and 105 is a pair of endless chains 106 which are provided with corresponding sets of inwardly extending pivot pins 107. Pivotally mounted on the pins 107 is a set of primary sizing rollers 108 having sleeves 109 and 110 at its opposite ends in which the pins 107 are received, these sleeves having necks 111 which are of a reduced diameter for a reason which will be made clear hereinafter. Provided on each of the sleeves 109 is a wheel in the form of a gear pinion 112 which rests upon the rail 67 and meshes with the rack teeth 68. Fixed on each sleeve 110 is a smooth faced wheel 113 which rests upon the rail 67'. The sleeves 109 and 110 are provided respectively with annular grooves 114 and 115, the purpose for which will be made clear hereinafter.

Provided between each of the chains 106 and adjacent ends of the rollers 108 is a set of movable roller guides 120 which are illustrated in detail in Figs. 6, 7, 8 and 9. Each guide 120 comprises a plate 121 of substantially triangular form having a horizontal slot 122 in its upper portion and a vertical slot 123 disposed centrally therein and opening downwardly from the middle of the slot 122 and perpendicular thereto. The slot 123 continues upwardly entirely through the plate 121 above the slot 122. This open upper end of the slot 123 is closed by a cap plate 125 which is secured to the plate 121 by screws 126. The plate 125 is thicker than the plate 121, and the side edges of the slot 123 are reinforced by a flange 127 which adds to the thickness of the plate 121 throughout the extent of this flange to make the plate 121 equal in thickness to the plate 125 in the area of the flange 127.

The guides 120 on each side of the sizer 15 are disposed in alternately reversed relation to each other as shown in Fig. 4, with each pair of adjacent ends overlapping, and with the neck 111 of one of the sleeves 109 or 110 extending through the slots 122 in the overlapping portions of that pair of guides, thus causing all of the guides 120 on each side of the machine to be linked together in an endless succession coextensive with the adjacent chain 106.

The slot 122 on each of the guides 120 is just sufficiently long so that the sleeve necks 111 lie snugly in the extreme ends of these slots as shown in Fig. 4 when the guides 120 are supported by those portions of the chains 106 which ride upon the rails 66 and 66' and are a part of the upper flight of the conveyor 17. This is important as all the sizing done by the sizing conveyor 17 is accomplished by that portion of this conveyor comprised in said upper flight, and it is necessary while the sizing is being done for each of the guides 120 to be exactly centered relative to the two rollers 108 on which it is supported whereby the central axis of the slot 123 of that guide lies in a vertical plane which bisects the space between said pair of primary rollers 108.

In addition to the series of primary sizing rollers 108, the sizing conveyor 17 includes an endless series of movable rollers 130, each of which has trunnions 131 and 132 on its opposite ends. Each of the rollers 130 is mounted on a pair of the guides 120 carried by an adjacent pair of the primary rollers 108 so that this roller 130 is vertically slideable in a plane bisecting the space between said pair of rollers 108 when the latter are disposed within the upper horizontal flight of the conveyor 17. This is accomplished by the trunnions 131 and 132 of this roller 130 extending through the vertical slots 123 of the pair of guides 120 on which this roller is mounted (Fig. 3). These trunnions are of a size to make a close fit with the walls of the slots 123 whereby the roller 130 is free to rotate but is confined by the close sliding fit of the trunnions 131 and 132 in the slots 120 to vertical movement in the aforesaid space bisecting plane.

While a part of said upper flight of conveyor 17, each roller 130 is maintained in a horizontal position by a gear pinion 133 fixed on trunnion 131 and a wheel 134 fixed on the trunnion 132. The pinion 133 rests upon the track 96 and meshes with the rack teeth 97 provided on the upper surface of said track. The wheel 134 rests upon the smooth upper surface of the track 96'.

The trunnions 131 and 132 are provided respectively with grooves 135 and 136 which lie at all times in the planes of the grooves 114 and 115 respectively of the roller sleeves 109 and 110. In side assembly 19, the guide rails 40 with upturned ends 41 and 42 and the guide rails 72, 74, 75 and 77 all lie in the same longitudinal plane as the grooves 114 and 135. Similarly, on the other side of the machine the corresponding guide rails of the frame side assembly 20 lie in the same plane as the grooves 115 and 136. From this fact, it is seen that as the conveyor 17 is caused to travel about its endless path in the sizer 15, the grooves 114 and 135 ride on the edges of the guide tracks aforementioned in the side assembly 19 and the grooves 115 and 136 ride on edges of the corresponding guide tracks in the side assembly 20 so that the rollers having these grooves are caused to rotate on these rails thus substantially reducing the friction incident to operating the machine and preserving all of the rollers in a proper alignment and relative spacing so that precision sizing may be accomplished by the sizer 15 with a relatively small amount of power.

*Segregating and discharge mechanism 18*

This mechanism includes a horizontal conveyor 140 having a flat endless belt 141 which is trained about relatively long pulleys 142 mounted on shafts 143 and 144 which journal in bearings 45 and 46, and 45' and 46' respectively. A suitable power means (not shown) is connected to the shaft 144 for driving the conveyor 140 to cause the upper flight of the belt 141 to travel in the direction of the arrow 145.

Mounted on the channel members 90 is a series of baffles 150, each of which has a vertical wall 151 and an inclined wall 152 bent rearwardly from the upper edge thereof. Upper and lower edges of the baffles 150 are preferably provided with rubber cushions 153. These upper edges of the baffles 150 are provided with notches 154 to permit them to extend upwardly between lower ends of the guides 120 as shown in Fig. 3.

Opposite ends of each baffle 150 are secured as by screws 156 to slide gibs 157 which slideably fit over inner faces of the channels 90 and 90'. Extending through the slots 92 and 92' in the channels 90 and 90' and through suitable aligned holes in the gibs 157 of each baffle 150 is a shaft 160 having fixed thereon gear pinions 161 and 162 which mesh respectively with gear pinions 91 and 91'.

Opposite ends of each of the shafts 160 is provided with pins 165 to either of which a crank (not shown) may be applied to rotate that shaft and thus shift the baffle 150 with which it is associated longitudinally in the sizer 15. In this manner, the location and spacing of the various baffles 150 may be varied at will to alter the groups into which articles may be separated by the sizer.

As shown in Figs. 2 and 10, the upper edges of the inclined walls 152 of the baffles 150 lie close to the upper flight of the sizing conveyor 17 and the fruit escaping downwardly through this conveyor drops onto one of the inclined baffle walls 152 or between a pair of adjacent baffles 150 and is thus delivered in groups between vertical walls 151 of adjacent baffles 150 and onto the upper surface of the belt 141. Suitable conveyors or chutes (not shown) are provided to receive the fruit thus deposited on the belt 141 between each adjacent pair of baffles 150 and discharged laterally from between these baffles by movement of the belt 141 in the direction of the arrow 145 (Fig. 1).

*Operation*

To start the sizer 15, the power means, such as a suitable electric motor, which is connected with the shafts 103 and 144, is energized to rotate these shafts and thus drive the sizing conveyor 17 and the transverse discharge conveyor 140. The fruit or other rollable articles to be segregated are then delivered on top of the conveyor 17 at the left-hand or receiving end thereof as through a chute 170 (Fig. 2). Fig. 10 illustrates the manner in which fruit F thus delivered onto the conveyor 17 is sized thereby. This is effected by the gradual increase in the spacing of the vertically movable rollers 130 from the primary rollers 108. The rollers 108 travel in a horizontal plane throughout the period that they are located in the upper flight of the sizing conveyor 17 by virtue of the fact that the tracks 67 and 67' are straight and are supported horizontally in the machine. While thus travelling, the rollers 108 are constantly rotated by the gear pinions 112 meshing with the rack teeth 68 provided on the track 67.

As the rollers 130 travel with the upper flight of the conveyor 17, they are supported at their opposite ends by the rail sections 96 and 96' and are rotated constantly in the same direction and at substantially the same rate as the rollers 108 by the gear pinions 133 meshing with the rack teeth 97 on the rail 96.

The rail sections 96 and 96' may be disposed to form two straight tracks as shown in the drawings which are inclined downwardly to increase the spaces between the movable rollers 130 and the primary rollers 108 at a uniform and constant rate. On the other hand, the sections 96 and 96' may be set by adjustment of the bolts 94 and 94' in stepped relation so that the rollers 130 drop suddenly as the gear pinions 133 and wheels 134 roll from the end of one of the pairs of track sections 96 and 96' onto the pair immediately following.

Whichever form the tracks 96 and 96' are given by their adjustable mounting on the plates 87 and 87', the baffles 150 are adjusted to properly receive the segregated fruit as this drops downwardly through the sizing spaces formed between the primary rollers 108 and the vertically movable rollers 130.

Referring now to Figs. 11, 12 and 13, a modified form of the invention is there illustrated which renders it especially adaptable to handling fruits such as tomatoes which are flattened at the poles so that the axial dimension of the fruit is considerably less than the diameter thereof. In this modification, the movable rollers 130 are provided with guiding rings 180 which preferably are formed of rubber and have soft flexible fingers 181 radiating therefrom. The rings 180 are spaced along the rollers 130 so that fruit, such as tomatoes T, being sized by the sizer 15, will be caused to turn on edge in coming to rest between one of the rollers 130 and one of the rollers 108 as shown in Figs. 11 and 12, that is wtih their axes parallel with the rollers 108 and 130 and presenting their peripheries to the rollers 108 and 130 with the result that they will be segregated by the sizer 15 in accordance with their diameters.

The rings 180 yield when the axial dimension of a piece of fruit is greater than the spacing between adjacent rings 180 as shown in Fig. 12 and thereby avoid damaging the fruit.

An alternative form of flexible guide ring 190 is shown in Fig. 13 which includes a spring steel wire ring 191 which is supported by spiral spokes 192 of similar material, the inner ends of which have lugs 193 which are driven into the wood of the roller 130 at diametrally opposite points. The guide rings 190 are designed to resist being flexed out of a plane perpendicular to the axis of the roller 130 but to flex before sufficient pressure is applied to a piece of fruit to damage the same.

What I claim is:

1. In a sizer the combination of: a frame; a pair of endless chains; means for supporting and causing said endless chains to travel in spaced relation on said frame; a set of primary rollers; means for pivotally mounting said primary rollers on said chains in uniform parallel spaced relation; a set of movable rollers; means for mounting one of said movable rollers on said chains in the space between each adjacent pair of said primary rollers, said means guiding said movable roller to maintain it in a vertical plane bisecting the space between the primary rollers between which said movable roller is mounted; means for causing said chains to travel on said frame to cause all of said rollers to be carried thereby in a given direction on said frame; and track means for supporting said primary rollers and said movable rollers to cause a progressive increase in the spacing between said movable rollers and said primary rollers as said rollers are carried in said direction by said chains.

2. In a sizer the combination of: a frame; a pair of endless chains; means for supporting and causing said endless chains to travel in spaced relation on said frame; a set of primary rollers; means for pivotally mounting said primary rollers on said chains in uniform parallel spaced relation; a set of drop rollers; means for mounting one of said drop rollers on said chains in the space between each adjacent pair of said primary rollers, said means guiding said drop roller to maintain it in a vertical plane bisecting the space between the primary rollers between which said drop roller is mounted; means for causing said chains to travel on said frame to cause all of said rollers to be carried thereby in a given direction on said frame; and track means for supporting said first mentioned group of rollers and said drop rollers and causing the latter to descend to progressively increase the spacing between said drop rollers and said primary rollers as said rollers are carried in said direction by said chains.

3. In a sizer the combination of: a frame; a pair of endless chains; means for supporting and causing said endless chains to travel in spaced relation on said frame; means for rotatably mounting a set of rollers on said chains in uniform spaced relation; means for mounting a movable roller on said chains in the space between each adjacent pair of the aforesaid rollers, said means guiding said movable roller to maintain it in a plane perpendicular to said chains and bisecting the space between the rollers between which said movable roller is mounted; means for causing said chains to travel on said frame to cause said rollers to be carried thereby in a given direction on said frame; diverging tracks for supporting said first mentioned group of rollers and said movable rollers to cause a progressive increase in the spacing between said movable rollers and said other rollers as said rollers are carried in said direction by said chains; and means on said rollers and said tracks for causing all of said rollers to rotate in the same direction and at a substantially uniform rate.

4. A combination as in claim 1 in which said movable roller mounting means comprises a series of guides adjacent each of said chains which are linked together by the means for pivotally mounting said primary rollers upon said chains, each of said guides having a vertical guide slot; and trunnions on opposite ends of each movable roller which extend through and are guided by said guide slots in a corresponding pair of said guides.

5. A combination as in claim 1 in which said movable roller mounting means comprises a series of guides adjacent each of said chains which are linked together by the means for pivotally mounting said primary rollers upon said chains, each of said guides having a vertical guide slot; trunnions on opposite ends of each movable roller which extend through and are guided by said guide slots in a corresponding pair of said guides; and wheels on said primary rollers and on said trunnions which ride on said track means to cause all of said rolls to rotate in the same direction as they travel with said chains.

6. A combination as in claim 1 in which said movable roller mounting means comprises a series of guides adjacent each of said chains which are linked together by the means for pivotally mounting said primary rollers upon said chain, each of said guides having a vertical guide slot; trunnions on opposite ends of each movable roller which extend through and are guided by said guide slots in a corresponding pair of said guides; and wheels provided on opposite ends of said primary rollers and on said trunnions which wheels roll on said track means, the wheels on at least one side of said sizer being gear pinions while the track sections on which said pinions ride have rack teeth with which said pinions mesh to cause all of said rollers to be positively rotated in the same direction and at substantially the same rate as said rollers travel with said chains.

7. In a sizer the combination of: a frame; a pair of endless chains; means for supporting and causing said endless chains to travel in the same direction at the same rate along corresponding paths in spaced parallel relation on said frame; chain tracks for supporting corresponding flights of said chains; a series of inwardly extending spaced corresponding pairs of pins provided on said chains; a set of primary rollers having sleeves extending from their opposite ends to receive said pins and thus pivotally mount said rollers on said chains; a set of wheels, one of which is provided on each of said sleeves; a pair of tracks disposed parallel to said chain tracks and on which said wheels roll to support said primary rollers; a series of guides on each side of said sizer, each of said guides having openings which receive the sleeves of corresponding ends of a pair of said primary rollers, the guides of each series thus overlapping each other and being linked together by said roller sleeves on one side of said sizer, each of said guides also having a guide slot at right angles to the plane of said sleeve opening; a set of movable rollers having trunnions at their opposite ends and wheels fixed on said trunnions, said trunnions extending through and being guided by said guide slots; and a pair of tracks on which said trunnion wheels roll, said guide tracks diverging relative to said sleeve wheel track whereby travel of said rollers with said chains causes a progressive change in the spacing between said movable rollers and said primary rollers.

8. A combination as in claim 7 in which the wheels aforesaid on one side of said sizer are gear pinions and the tracks on which they ride are provided with rack teeth with which said pinions mesh so as to positively rotate all of said rollers in the same direction, and at substantially the same rate, as said rollers travel with said chains.

BRUNO E. BALDUF.

REFERENCES CITED

The following references are of record in the file of this patent:

UNITED STATES PATENTS

| Number | Name | Date |
| --- | --- | --- |
| 1,245,662 | Black | Nov. 6, 1917 |
| 1,385,218 | McIntyre | July 19, 1921 |
| 1,429,764 | O'Quinn | Sept. 19, 1922 |
| 1,448,689 | Hatch | Mar. 13, 1923 |
| 1,899,292 | Rienks | Feb. 28, 1933 |
| 2,099,223 | Paxton | Nov. 16, 1937 |
| 2,244,546 | Stockdale | June 3, 1941 |
| 2,353,941 | Stebler | July 18, 1944 |
| 2,365,822 | Jones | Dec. 26, 1944 |